(12) United States Patent
Hoglund

(10) Patent No.: US 8,769,689 B2
(45) Date of Patent: Jul. 1, 2014

(54) DIGITAL DNA SEQUENCE

(75) Inventor: Michael Gregory Hoglund, Monte Sereno, CA (US)

(73) Assignee: HB Gary, Inc., Sacremento, CA (US)

( * ) Notice: Subject to any disclaimer, the term of this patent is extended or adjusted under 35 U.S.C. 154(b) by 1064 days.

(21) Appl. No.: 12/386,970

(22) Filed: Apr. 24, 2009

(65) Prior Publication Data

US 2011/0067108 A1 Mar. 17, 2011

(51) Int. Cl.
*G06F 21/00* (2013.01)
*G06F 21/55* (2013.01)

(52) U.S. Cl.
CPC .................................. *G06F 21/554* (2013.01)
USPC ................... 726/24; 726/22; 726/23; 726/25; 713/200

(58) Field of Classification Search
CPC ...................................................... G06F 21/554
USPC ....................................... 726/22–25; 713/200
See application file for complete search history.

(56) References Cited

U.S. PATENT DOCUMENTS

| | | | |
|---|---|---|---|
| 5,923,872 A | 7/1999 | Chrysos et al. | |
| 6,683,546 B1 | 1/2004 | Torrubia-Saez | |
| 7,233,935 B1 | 6/2007 | Chandler | |
| 7,711,779 B2 | 5/2010 | Goodman et al. | |
| 8,055,599 B1 | 11/2011 | Werth | |
| 8,103,875 B1 | 1/2012 | Ramzan et al. | |
| 8,335,750 B1 | 12/2012 | Werth | |
| 2002/0188859 A1 | 12/2002 | Dollens | |
| 2003/0065926 A1* | 4/2003 | Schultz et al. | 713/188 |
| 2003/0078899 A1 | 4/2003 | Shanahan | |
| 2005/0060643 A1 | 3/2005 | Glass et al. | |
| 2006/0020397 A1 | 1/2006 | Kermani | |
| 2006/0029975 A1 | 2/2006 | Barber et al. | |
| 2007/0092103 A1 | 4/2007 | Mihcak et al. | |
| 2007/0180262 A1* | 8/2007 | Benson | 713/186 |
| 2007/0240217 A1* | 10/2007 | Tuvell et al. | 726/24 |
| 2008/0040505 A1 | 2/2008 | Britto et al. | |
| 2008/0127336 A1 | 5/2008 | Sun et al. | |
| 2008/0184367 A1 | 7/2008 | McMillan et al. | |
| 2009/0126012 A1 | 5/2009 | Treadwell et al. | |
| 2009/0165131 A1 | 6/2009 | Treadwell | |
| 2009/0271454 A1 | 10/2009 | Anglin et al. | |
| 2010/0030996 A1 | 2/2010 | Butler, II | |
| 2011/0093426 A1 | 4/2011 | Hoglund | |

OTHER PUBLICATIONS

Notification Concerning Trans. of Int'l Prelim. Report on Patentability dated Jan. 12, 2012 , 1 page.
International Preliminary Report on Patentability dated Jan. 4, 2012, 1 page.
Written Opinion of the International Searching Authority dated Oct. 4, 2011, 3 pages.
Written Opinion of International Searching Authority Supplemental Boxes dated Oct. 4, 2011, Parts I & II.

(Continued)

*Primary Examiner* — Jeffrey Pwu
*Assistant Examiner* — Helai Salehi
(74) *Attorney, Agent, or Firm* — Morrison & Foerster LLP

(57) ABSTRACT

In an embodiment of the invention, a method of classifying a data object includes: scanning the data object; evaluating contents of data objects base on at least one selected rule; and generating a digital DNA sequence that classifies at least some contents in the data object.

28 Claims, 12 Drawing Sheets

(56) References Cited

OTHER PUBLICATIONS

"Identifying almost identical files using context triggered piecewise hashing" by J. Kornblum, © 2006. Retrieved from the Internet: http://dfrws.org/2006/proceedings/12- Kornblum. Total pp. 7.
"md5bloom: Forensic filesystem hashing revisited" by V. Roussev, et al., © 2006. Retrieved from the internet: http://dfrws.org/2006/proceedings/11-Roussev.pdf. Total pp. 9.
"Multi-resolution similarity hashing" by V. Roussev, et al., © 2007. Retrieved from the internet:http://www.dfrws.org/2007/proceedings/p105-roussev.pdf. Total pp. 9.
Roussev, V. (Mar. 2009). "Hashing and Data Fingerprinting in Digital Forensics," *IEEE Digital Forensics*: 49-55.
Stein, B. (2005). "Fuzzy-Fingerprints for Text-Based Information Retrieval," *Journal of Universal Computer Science*: 572-579.
Wiehe et al. (2006). "Quantitative Analysis of Efficient Antispam Techniques," *IEEE Workshop on Information Assurance*: 1-7.
Hoglund, U.S. Office Action mailed on Oct. 3, 2012, directed to U.S. Appl. No. 12/459,203; 11 pages.
Notification of Transmittal of The Int. Search Report and the Written Opinion of The Int. Searching Authority, or The Declaration dated Nov. 4, 2010, 1 pg.
Notes to Form PCT/ISA220, 2 pgs, Jul. 2009.
Notification of Transmittal of The Int. Search Report and The Written Opinion of the Int. Searching Authority, or The Declaration dated Nov. 4, 2010, 3 pgs.
Written Opinion of The International Searching Authority dated Nov. 4, 2010, 4 pgs.
Search History for Application No. PCT/US2010/001211 dated Jul. 7, 2010, 3 pgs.
Notes to Form PCT/ISA220, 2 pgs, Nov. 4, 2010.
"Volatile Systems", by Greg Hoglund. http://volatilesystems.blogspot.com/search?q=greg+hoglund, Aug. 21, 2007.
Written Opinion of The International Searching Authority dated Nov. 4, 2010; 4 pgs.
Otification of Transmittal of The Int. Search Report and The Written Opinion of The Int. Searching Authority, or the Declaration dated Nov. 4, 2010, 3 pgs.
Notification of Transmittal of The Int. Search Report and The Written Opinion of The Int. Searching Authority, or The Declaration dated Oct. 4, 2010, 1 pg.
Notes to Form PCT/ISA220, 2 pgs., Jul. 2009.
Written Opinion of The International Searching Authority dated Oct. 4, 2010, 5 pgs.
International Search Report, 2 pgs., Oct. 4, 2010.
Notification of Transmittal of The Int'l. Preliminary Report on Patentability dated Apr. 28, 2011, 2 pages.
Notification of Transmittal of The Int'l. Preliminary Report on Patentability, 1 page, Jan. 4, 2012.
International Preliminary Report on Patentability, 5 pages, Apr. 26, 2011.

* cited by examiner

| extended 0/1 305 | mode 0/1 310 | reserve field 315 | reserve field 320 | Not 0/1 325 | And/Or 0/1 330 |
|---|---|---|---|---|---|

Control code (C)

| extended 0/1 305 | mode 0/1 310 | Good/Bad 0/1 315 | reserved field 320 | Weight fields 0 to 15 335 |
|---|---|---|---|---|

Control code (C)

The matching expression has three components:

| N | Eggdrop.exe | iu |
| 605 | 610 | 615 |
| ↑ | ↑ | ↑ |
| Rule type | Rule Body | Rule Restrictions |

N"eggdrop.exe."iu

```
                        ┌─────600A
N"eggdrop.exe"iu
^^       ^^
| |      | |
| |      | +--- usermode only (u)
| |      +--- case insensitive (i)
| +---   string match "xxx" between double quotes
+---     rule type N is Name (name of module, driver, file, or
                                          process)
```

The rule type is extensible. The following are examples of rule types and associated expressions:

Table 1

```
Rule types:
Abbreviation    Name             Description
============    ====             ===========
H               %HOOK%           Any hook
Hp              %HOOKPOINTER%    A function pointer hook
Hd              %DETOUR%         A function detour
T               %traitpointer"   References another trait code
Trg             %TARGET%         The target of a function hook
                                 or detour
Pc              %CODEPATCH%      A patch made against code
Pd              %DATAPATCH%      A patch made against data
L               %LINK%           Any chain (linked list)
Ldc             %DRIVERCHAIN%    Which driver chain the driver or
                                 structure is a member of
B               %BYTES%          A straight byte search
Bc              %CODEBYTES%      search only code,
                                 same as B[00 11 22 33 44]c (c ==
                                 code)
Bd              %DATABYTES%      search only code,
                                 same as B[00 11 22 33 44]d (d ==
                                 data)
S               %STRING%         A string search
C               %CALL%           A function call Z               %FUZZY%          A fuzzy hash
```

FIGURE 7

```
Z"F92EC292021302C252C76ECECDF12E5DADA34BA94456D"k AND %MATCHPERCENT% > 80
^ ^                                                  ^     \         \
| |                                                  |    815        820
| |                                                  +-- 810 (kernel mode)
| |
| +---- string (805) of the hash
+--- rule type Z is fuzzy hash
```

Figure 8

```
900
  \
C"KeAttachProcess"k{extended qualifier}
 \             \      \         \
 910          915     920       905
```

Figure 9A

```
900A                    925  930 935
  \                      /    /   /
C"KeAttachProcess"k{%PUSH%,len,arg}
 \             \      \         \
 910          915     920       905A
```

Figure 9B

```
          1000A
1005A        \
 \
N"eggdrop.exe"iu
^^             ^^
| |            | |
| |            |+--- usermode only (u) (1010)
| |            +-- case insensitive (i)
|+---- string match "xxx" between double quotes
+--- rule type N is Name (name of, e.g., module, driver, file,
or process) (1020)
```

Figure 10A

```
1000B
  \                                       1015
                                           /
(N = "eggdrop.exe"i AND %RING% = "usermode")
```

Figure 10B

```
1000C
  \                                       1015
                                           /
(%NAME% = "eggdrop.exe"i AND %RING% = "usermode")
   \
   1025
```

I"KeAttachProcess"k  AND  %DRIVERCHAIN% = "NDIS"
^^                  ^         ^
| |                 |         |
| |                 |         +-- named type (1115)
| |                 +--- kernel mode only (1110)
| |
|+---- string match "xxx" between double quotes
+--- rule type I is Import (1105)
```

H"EnumServiceGroupW"u
^^                  ^
| |                 |
| |                 +-- user mode only (1215)
| |
|+---- string match "xxx" between double quotes (1210)
+--- rule type H is Hook (1205)
```

B[60 9C E8 ?? ?? ?? ?? 9D 61]c
^^                            ^
| |                           |
| |                           +-- code only (1315)
| |
|+---- hex match [xxx] between brackets (1310)
+--- rule type B is byte search (1305)
```

Figure 13

DIGITAL DNA SEQUENCE

BACKGROUND

Interconnected systems, such as, for example, the global Internet, can deliver information to more people at a faster speed and is important in the current global economy. However, as recent history has shown, these interconnected systems are often dealing with security risk issues. Security risks include, but are not limited to, for example, identity theft and theft of proprietary information.

However, previous approaches are unable to detect variations of an original file in memory (RAM). Furthermore, previous approaches are not efficient in detecting executables in RAM, particularly if some parts of the executable portions are altered at runtime. Additionally, previous approaches are not efficient in detecting variants of the same malware or malware protected by a packer or encryptor. Malware is typically is software designed to infiltrate or damage a computer system without the owner's informed consent. Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 3A and 3B are block diagrams of examples of the control mode (in the control code) as being set in the match definition mode and the expression mode, respectively, in accordance with an embodiment of the invention.

FIG. 7 is a table that list additional examples of rule types and associated descriptions and names for the rule types, which can be used in an embodiment of the invention.

FIG. 8 is a block diagram of an example rule for a fuzzy hash algorithm, in accordance with an embodiment of the invention.

FIGS. 9A and 9B are block diagrams of example rules with an extended qualifier, in accordance with an embodiment of the invention.

FIGS. 10A-10C are block diagrams that illustrate the longhand form for a rule, in accordance with an embodiment of the invention.

FIG. 11 is a block diagram of an example import rule, in accordance with an embodiment of the invention.

FIG. 12 is a block diagram of an example function hook rule, in accordance with an embodiment of the invention.

FIG. 13 is a block diagram of an example byte sequence rule, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
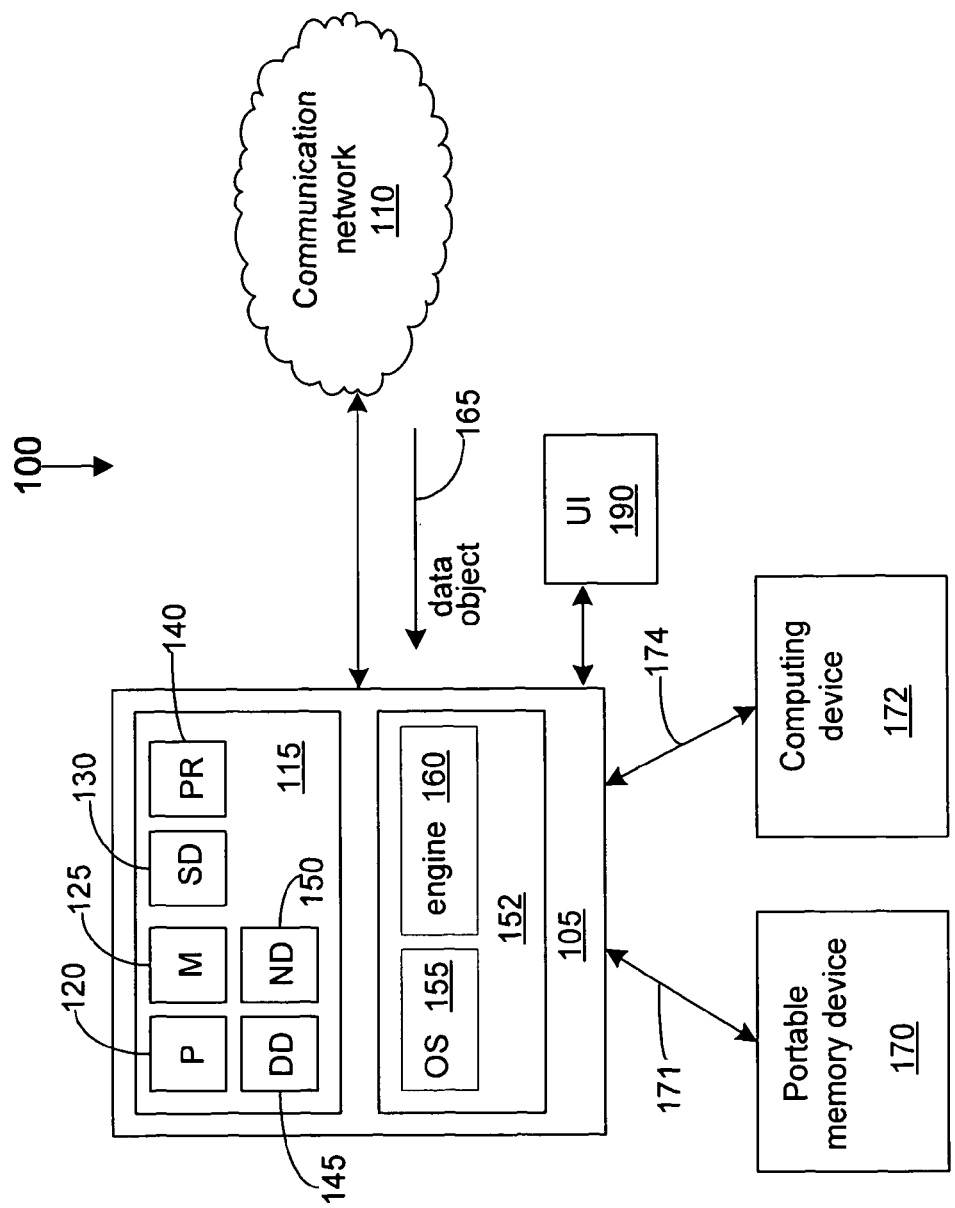
FIG. 1 is a block diagram of an apparatus (system) in accordance with an embodiment of the invention.

FIG. 1 is a block diagram of an apparatus (system) 100 that can be used in an embodiment of the invention. An example device 105 is connectable to a communication network 110. In another embodiment of the invention, the device 105 is a stand-alone computer that is not connected to a network. The device 105 can be, for example, a server or a computer. The optional network 110 is, for example, a public network such as a wide area network (e.g., Internet), a local area network (LAN), or a different type of private network or public network.

The device 105 includes standard hardware elements 115 that are used in computing operations or data transmissions. For example, the hardware elements 115 includes a processor 120, one or more memory devices 125, storage devices 130 such as disks, ports 140, a disk driver 145, a network driver 150, and/or other known hardware elements that are used in computing devices.

The device 105 also includes software elements 152 such as, for example, an operating system 155 that performs management functions and other functions that are known to those skilled in the art. Other standard hardware, software, or firmware components that can be used in the device 105 are not shown in FIG. 1 for purposes of clarity in the drawings.

In an embodiment of the invention, the processor 120 can execute a digital DNA sequencing engine 160 that performs various steps in the methods discussed below. The engine 160 is formed by software code based on a standard programming language (e.g., C, C++, or other suitable languages). The code in the engine 160 can be varied in order to vary, implement, or remove the various functions that will be discussed below.

As will be described below in the additional details or examples, the digital DNA sequencing engine 160 will evaluate any data object 165 that is received by the device 105 via the network 110. Alternatively, the data object 165 to be evaluated by the engine 160 is any object that is already represented (already existent or introduced) in physical memory associated with device 105, regardless of how that object 165 was received in or stored in the physical memory. The engine 160 will evaluate the data object 165 based upon rules that may be stored in a database or stored in the device 105 itself or in other suitable storage devices. For example, the rules can be stored in a memory 125 in the device 105 itself, in a portable memory device 170 that can be connected to the device 105, or in a computing device 172 that communicates via link 174 with the device 105. The portable memory device 105 can be, for example, a compact disk, portable disk drive, memory disk, USB-coupled memory chip, or other types of portable memory devices. The external link 171 to the portable memory device 170 can be, for example, USB.

The computing device 172 can be, for example, a server or another type of computing device. The link 174 can be a wired or wireless link and can also be, for example, a type of network connection such as, e.g., a LAN or private network.

Based on the evaluation of the data object 165, the engine 160 will then generate a digital DNA sequence which permits the data object 165 to be classified into an object type. The data object 165 can be any suitable digital objects that can be received by the device 105 (or data object 165 that is already in physical memory) such as, for example, but not limited to, data files such as Microsoft Word files, pdf files, modules, downloadable computer programs, html pages or other web pages, and/or other known suitable digital objects. Therefore the engine 160 provides a method of classifying a data object and provides a means for scanning the data object, means for evaluating contents of data objects base on at least one selected rule, and means for generating a digital DNA sequence that classifies at least some contents in the data object.

Figure 2:
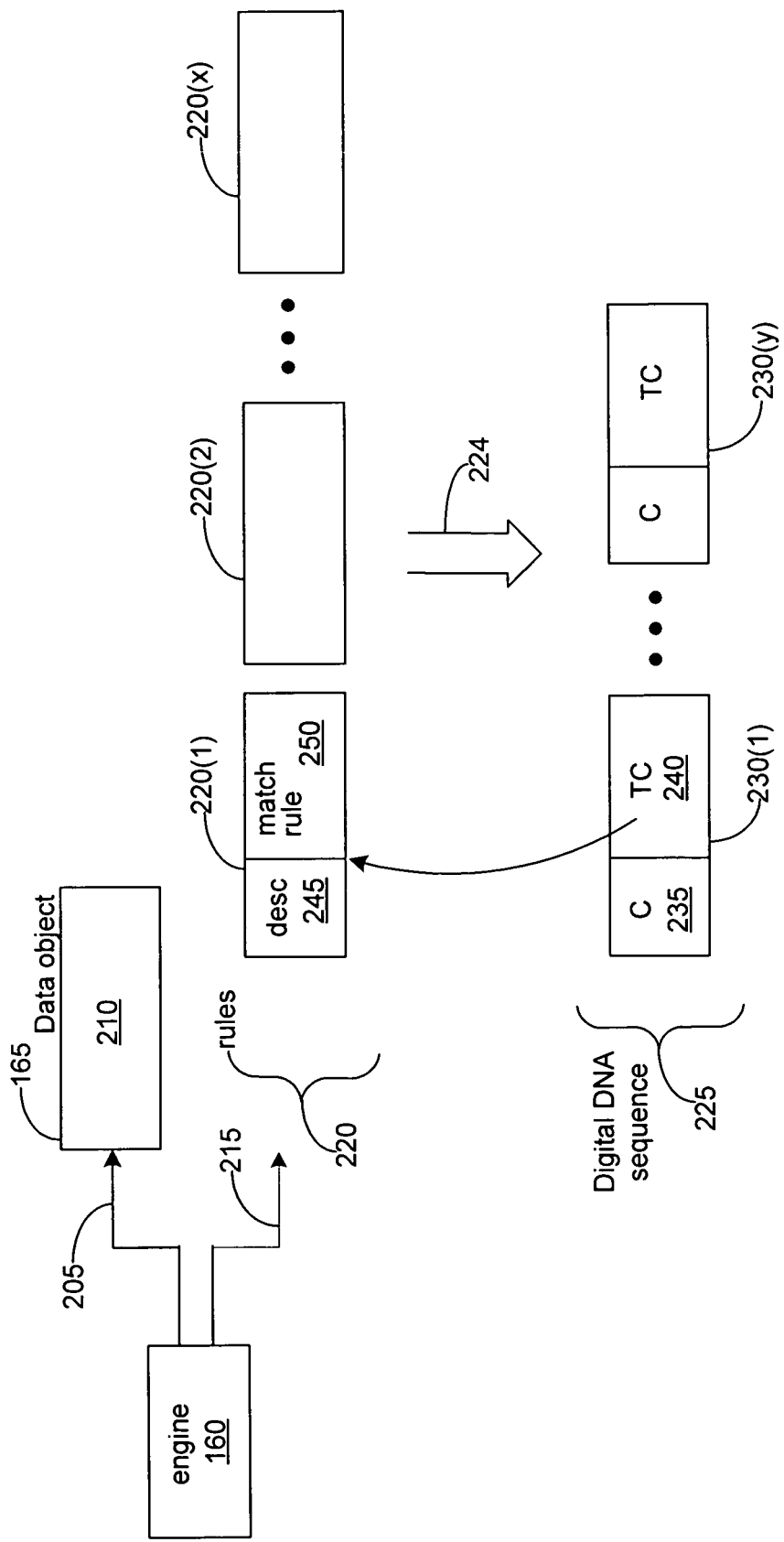
FIG. 2 is a block diagram that illustrates an operation of a system in accordance with an embodiment of the invention.

FIG. 2 is a block diagram that illustrates an operation of a system in accordance with an embodiment of the invention. The digital DNA (DDNA) sequencing engine 160 will scan 205 the data field (or data fields) 210 of a data object 165 that has been received by the device 105 (FIG. 1) or data object 165 that is in physical memory. Typically, the data object 165 will be stored in the memory 125 before scanning 205 of the fields 210. The engine 160 will compare 215 the values in the fields 210 with rules 220. As discussed above, the rules 220 can be stored in, for example, the device memory 105 or in other storage devices such as, for example, the portable memory device 170 (FIG. 1) or computing device (e.g., server) 172.

In the example of FIG. 2, the rules 220 are formed by the rules 220(1), 220(2) through 220(x) where x is any suitable integer. Therefore, the number of rules 220 can vary from one to an x number of rules. The engine 160 can use any standard fast string or value search algorithm for scanning the fields 210 and for matching the values in the fields 210 with the rules 220. The engine 160 will match the content in fields 210 with reference content that are referenced and compared by the rules 220. The set of rules 220 can be called as a "genome" of rules. The rules 220 can compare the reference data such as, for example, a string or substring, byte pattern, code, name of a process that will contain data to be matched, and/or the like, with respect to content or disassembled code in the data object field 210.

When the engine 160 performs the scanning 105 and comparison 215, the engine 160 will generate 224 a digital DNA sequence 225 for any string (or value) in field 210 that matches any string (or value) that are referenced by the rules 220. In the example of FIG. 2, the engine 160 generates the sequence 225 with the expressed traits 230(1) through 230(y) where y is any suitable integer. Therefore, the number of expressed traits can vary from one to a y number of traits, depending on how many rules have matched (i.e., fired) with strings in the fields 210. A trait has a rule, weight, trait-code, and description. A DDNA sequence 225 is formed by at least one expressed trait with reference to a particular data object 165 that has been evaluated by the DDNA engine 160 as discussed in various examples herein. Typically, a DDNA sequence 225 is formed by a set of expressed traits with reference to a particular data object 165 that has been evaluated by the DDNA engine 160 as discussed in various examples herein. In other words, a data object 165 is represented by a DDNA sequence 225 which is, in turn, formed by a set of traits that have been expressed against that data object 165. When a rule fires, then that means that the trait code (or trait) for that rule has been expressed. The engine 160 will store the generated sequence 225 in a selected target memory (e.g., memory 125 in FIG. 1) as set by the user or based on a default setting. In an embodiment of the invention, the traits can be concatenated together as a single digital file (or string) that the user can easily access.

In an embodiment of the invention, each expressed trait includes a control code (C) and trait code (TC). For example, the expressed trait 230(1) has the control code 235 and trait code 240. The trait code 240 is a digital hash value that references or be used to locate a trait description and trait matching rule in a data storage device (e.g., server or database 172). For example, the trait code 240 will reference the trait description 245 and trait matching rule 250 of rule 220(1). The trait description 245 will describe a characteristic of the string in a human-readable form (e.g., text form). For example, the trait description 245 will indicate that the matching string is, e.g., is a string that appears in a malware file (or other suspicious code or malicious code) or spyware file, a string that relates to intellectual property data, or a string indicating that the file is a Microsoft Word file, or computer viruses, or confidential information such as credit card numbers or other financial information, or other types of data objects. The trait matching rule 250 will identify a string to be searched for a matching string in the data object field 210. The string can be an attribute or data value associated with data content that is to be matched and detected (e.g., string found in malware, spyware, intellectual property data, or other files to be detected and identified by the engine 160). Typically, for a given data object to be classified into a class/category such as, e.g., malware, spyware, virus, file type such as Word, or other data objects, a plurality of rules 220 (i.e., a plurality of traits) will have to fire. However, for a given data object to be classified into other particular types of class/category, only one rule 220 may be required to fire.

The control code 235 is also set in value in the match rule field 250 and the details of the control code 235 will be discussed below with reference to FIGS. 3A-3B.

Referring again to the trait 230(1), the control code 235 is typically a byte value. The trait code 240 can be a 16-bit hash value, although other sizes can be used for the trait code 240 as well. As an example, the trait 230(1) can have the following values:

00 E3 86

The control value traits 235 are 00 in this example. The trait code 240 is "E3 86" in this example.

FIG. 3A and FIG. 3B are examples of the control mode 310 (in the control code 235) as being set in the match definition mode ("1" value) and the expression mode ("0" value), respectively, in accordance with an embodiment of the invention. The digital DNA sequencing engine 160 (FIG. 2) is programmed to set the values in the fields of control code 235 as shown in FIGS. 3A-3B.

Referring first to FIG. 3A, the extended field 305 is an optional field that will permit additional traits to be added to the control code 235. Therefore, in other embodiments of the invention, the optional fields in the control code 235 are omitted. When the extended field 305 is set at "1", then additional traits can be added in, for example, the reserve field 320. When the extended field 305 is set at "0", then there are no additional traits in the reserve field 320. Note that there can be additional reserve fields, in addition to the reserve field 320, for the control code 235.

The mode field 310 sets the mode of the control code 235 as either Match Definition mode (first mode) or Expression mode (second mode). In the example of FIG. 3A, the mode field 310 is set at "1" and as a result, the control code 235 is set in the Match Definition mode. In the Match Definition mode, values will be set in the Boolean fields 325-330. For example, NOT field 325 will apply the Boolean value "NOT" when field 325 is at value "1" and does not apply the Boolean value "NOT" when field 325 is "0". The AND/OR field 330 will apply the Boolean value "AND" when field 330 is "0" and will apply the Boolean value "OR" when field 330 is "1". The Boolean operators "NOT", "AND", "OR", "NAND" (NOT AND) and "NOR" (NOT OR) are well known to those skilled in the art.

Note also that other Boolean operators, such as, for example, exclusive-OR and exclusive-AND, can be added to the fields in the control code 235 or can be substituted in the Boolean fields that are shown in FIG. 3A.

As one example, assume that the NOT field 325 is set at "0" and the AND/OR field 330 is set at "0" by the engine 160 (FIG. 2). As a result of these settings in fields 325/330, the Boolean operator "AND" will be applied to the corresponding rule 220(1). If the rule 220(2) is also applied with the operator "AND", then all trait codes (in all rules that are subject to the AND operator) will have to be evaluated with respect to the values in the data object field 210. If all the rules subject to the AND operator do fire with respect to the values in the data object field 210, then a match has been found by the engine 160. As a result, the engine 160 will indicate in the Digital DNA sequence 225 that a match in the data object field 210 has been found with respect to the rules subject to the AND operator. If any of the rules subject to the AND operator does not fire based on the comparison with the values in the data object field 210, then the engine 160 will not indicate a match occurrence in the Digital DNA sequence 225 because not all of the rules subject to the AND operator had fired. For example, if each of the rules 220(1), 220(2) through 220($x$) (FIG. 2) are subject to the AND operator, then each of these rules 220(1), 220(2) through 220($x$) will have to fire based on comparison with values (strings) in the data object field 210, so that the engine 160 can indicate a match for the rules 220(1)-220($x$) in the sequence 225 for values (strings) in the data object field 210. In contrast, if each of the rules 220(1), 220(2) through 220($x$) (FIG. 2) are subject to the AND operator and if any one of the rules 220(1), 220(2) through 220($x$) does not fire based on comparison with values (strings) in the data object field 210, then the engine 160 will not indicate a match in the sequence 225 for values (strings) in the data object field 210.

As another example, if field 325 is "0" and field 330 is "1", then the Boolean operator "OR" will be applied to the corresponding rule 220(1). Since rule 220(1) is subject to the OR operator, if the rule 220(1) does fire based on comparison with values (strings) in the data object field 210, then the engine 160 will indicate in the sequence 225 that a match in the data object field 210 has been found with the rule 220(1) and with any other rule (subject to the OR operator) that has fired, irrespective of whether or not other rules 220 had fired.

In FIG. 3B, the mode field 310 is set at "1" by the engine 160 and as a result, the control code 235 is set in the Match Definition mode. In the Match Definition mode, field 315 will be a "positive confidence"/"negative confidence" field 315. If the field 315 is set to "0" (positive confidence), the field value in the weight field 335 will be a positive (+) integer sign. In one embodiment, the range of values in field 335 is from, for example, 0 through 15. However, in other examples, the range can be at other values (e.g., 0 through 20). Therefore, if field 315 is "0" and field 335 is "15", then the weight of the control code 335 is "+15". On the other hand, if field 315 is "1", then the field value in field 335 will be a negative (−) integer sign and the weight of the control code 335 in this example would be "−15".

The weight values −15 through +15 are confidence values that indicate if a data object 165 should belong or should not belong to a set/class/type/category of data objects. For example, a set could represent a particular class of data objects such as a particular malware, particular spyware, intellectual property data, software modules, particular files such as Microsoft Word or Powerpoint, or any other category of data objects or files that are known to those skilled in the art.

Figure 4:
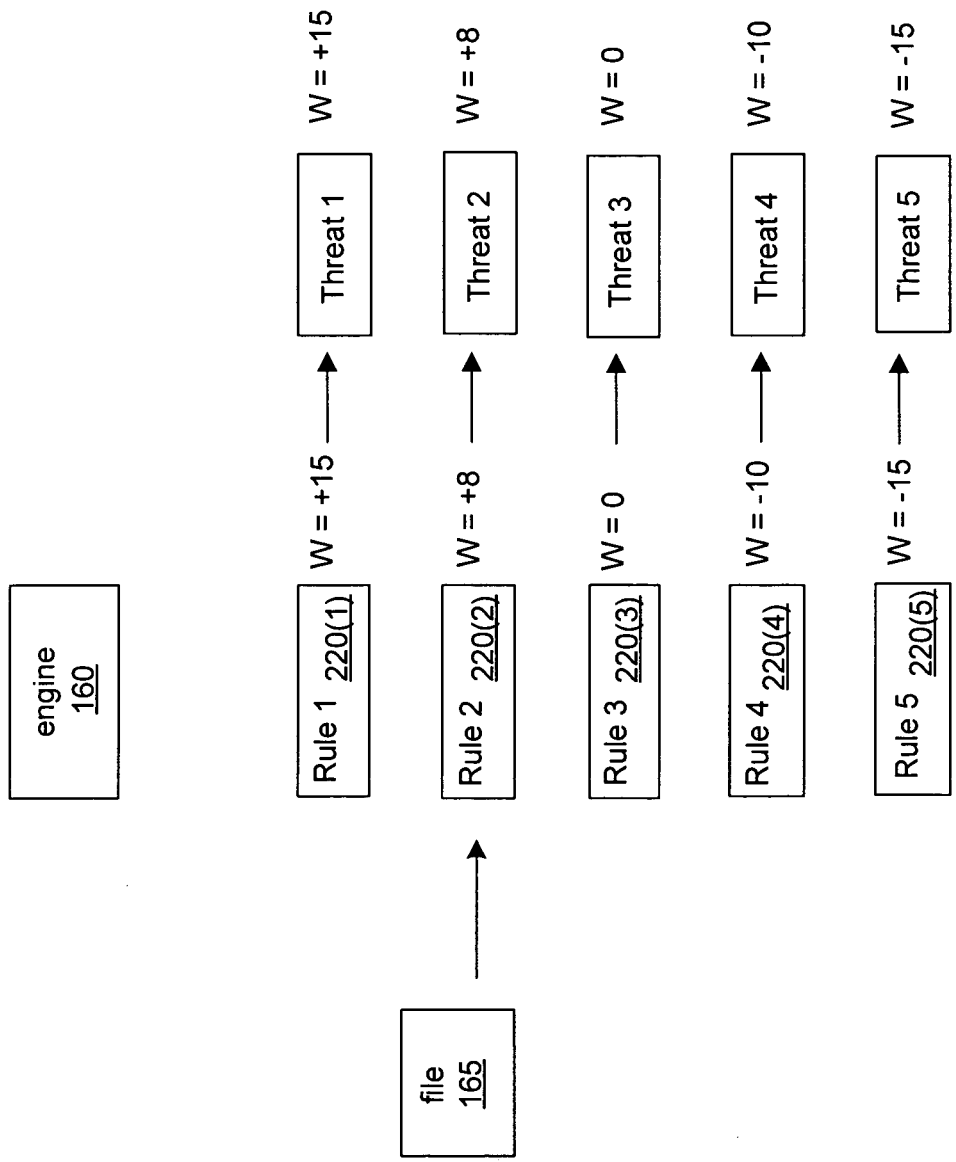
FIG. 4 is a block diagram that illustrates the use of rules with assigned weights, in accordance with an embodiment of the invention.

In the example of FIG. 4, assume that the engine 160 sets Rule1 220(1), Rule2 220(2), Rule3 220(3), and Rule4 220(4) at weight W=+15, weight W=+8, weight W=0, and weight W=−10, respectively. The weight values W for the rules are adjustable and configurable by the user of engine 160 and are set based upon the class of data objects to be detected. As noted above regarding these rules, each trait will have a rule and can have a weight. Therefore, a rule can be associated with a weight. Assume that the weight, +15, indicates that highest confidence that a data object is likely to belong to a given class, and the weight, −15, indicates the highest confidence that the data object is least likely (or less likely) to belong to that same given class. Therefore, the intermediate weight values, +8, 0, and −10, indicate the varying degrees of the confidence value. Therefore, a higher positive value indicates a higher confidence that a data object is a member of a class. In other words, a +15 weight value indicates a higher confidence that a data object is member of a class and a lower weight value (e.g., +8 weight value) indicates a lower confidence (as compared to the higher +15 weight value) that the data object is a member of that class.

A higher negative value indicates a higher confidence that a data object is a not member of a class. As a further example, a −15 negative weight value indicates a higher confidence that a data object is not member of a class and a lower negative weight value (e.g., −8 weight value) indicates a lower confidence (as compared to the −15 greater negative weight value) that the data object is not a member of that class.

Note that the granularity of the confidence value is not limited to integer values. Therefore, the engine 160 can be configured to generate more fine granularity of confidence values (e.g., +8.0, +8.5, +0.5, −0.8, −8.9, and the like). Additionally, in FIG. 5 below, a discussion is presented on a "discrete weight decay" algorithm in accordance with an embodiment of the invention, where a repeating weight will have less effect as the firing of a rule with such weight occurs repeatedly.

The rules, Rule1 220(1), Rule2 220(2), Rule3 220(3), and Rule4 220(4), are each in an associated trait. Assume in the example of FIG. 4 that Rule1 220(1), Rule2 220(2), Rule3 220(3), and Rule4 220(4) will detect and fire for malware, spyware, Microsoft Word documents, and html links, respectively, in any data object 175 (e.g., file). Note that the rules 220(1)-220(4) can be programmed to detect for other classes/categories/types of data objects, as mentioned above. As also mentioned above, typically, for a given data object to be classified into a class/category/type such as, e.g., malware, spyware, virus, file type such as Word, or other data objects, a given plurality of rules 220 (i.e., a plurality of traits) will have to fire for a given type of data object that is being scanned by the engine 160. Note, however, that for a given data object to be classified into a particular type of data object, only one rule 220 may need to fire in other examples.

If the rules 220(1)-220(4) do fire, due to a positive match in the data fields 210 of data object 165, then the engine 160 will generate the digital DNA sequence 225 (FIG. 2) that can list the Threat1, Threat2, Threat3, and Threat4 which correspond, respectively, to Rule1 220(1), Rule2 220(2), Rule3 220(3), and Rule4 220(4) which have all fired. The threats (Threat1, Threat2, Threat3, and Threat4) will indicate, for example, their corresponding rules that have fired and the corresponding detected class/category/type of data objects in the data object 165. The engine 160 can also display the details associated with Threat1, Threat2, Threat3, and Threat4 in a human-readable form (e.g., text) via, for example, a user interface 190 (FIG. 1) (e.g., screen or printout). Threat1, Threat2, Threat3, and Threat4 will also indicate the confidence values +15.0, +8.0, 0, and −10, respectively, which list the likelihood that the data object 165 belongs in the class/category/type of malware, spyware, Microsoft Word documents, and html links, respectively, in this example. Therefore, the engine 160: (1) indicates the highest likelihood (based on the +15 weight value) that the data object 165 contains malware, (2) indicates a lesser likelihood (based on the +8 weight value) that the data object 165 contains spyware, (3) indicates a likelihood (based on the +0 weight value) that the data object 165 is a Word document or may not be a Word document, and (4) indicates an intermediate likelihood (based on the −10 weight value) that the data object 165 is not an html file.

As another example, the engine 160 also generates a Threat5 output which indicates a high likelihood (based on the W=−15 weight value) that the data object is not a data object in a class that is defined by Rule5 220(5). As an example, this class defined by Rule5 is the pdf type documents.

Discrete Weight Decay Algorithm

Figure 5:
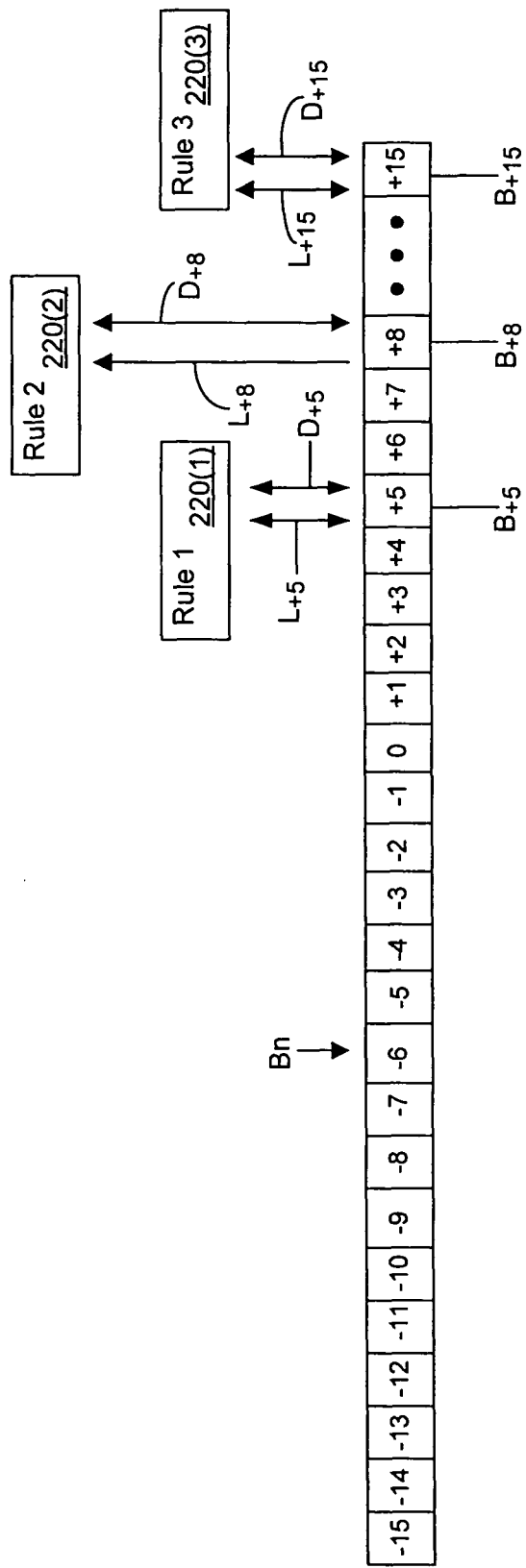
FIG. 5 is a block diagram that illustrates an operation of a sequence weighting algorithm ("discrete weight decay" algorithm), in accordance with an embodiment of the invention.

FIG. 5 is a block diagram that illustrates an operation of a sequence weighting algorithm ("discrete weight decay" algorithm), in accordance with an embodiment of the invention. The engine 160 can be programmed to perform an embodiment of this algorithm. As will be discussed below, this algorithm permits: (1) the weight value of a rule (or rule trait) to affect the summed weight value, (2) as additional values are received for a given weight value for a rule, the less effect that those additional values will have on the summed weight value.

A single trait (single rule) can only be weighted from a given range (e.g., −15 to +15), but the overall weight for a given Digital DNA sequence 225 can be much larger because all weights of traits (rules) that have fired are summed in the DDNA sequence 225. In other words, all weights in a sequence 225 are summed to arrive at a final weight Σ. This discrete weight decay algorithm is used to diminish the effects of a single repeating weight value, as will be shown in the example below with reference to FIG. 5. For example, the discrete weight decay algorithm prevents a very long string of weight traits (e.g., weight=5) from producing a very large resultant sequence weight Σ.

In FIG. 5, the discrete weight decay algorithm divides the range of weights into buckets from, e.g., −15 to +15. A bucket can be, for example, a memory buffer or memory bin in the memory 125 (FIG. 1) of device 105 or in other suitable memory areas (e.g., in the computing device 172). Each bucket is assigned an associated weight multiplier. Whenever a trait (rule) is found (fires) with a given weight W, that weight W is first multiplied by the weight multiplier. Then, the weight multiplier WM is reduced by some decay constant. Eventually a repeating weight will cause the weight multiplier to arrive at zero, thus eliminating the effect of that weight from that point forward. The repeating weight occurs whenever a rule corresponding to that weight has fired.

This algorithm can be generically shown as a two step arithmetic process:

$$\text{new\_sequence\_weight} = \text{old\_sequence\_weight} + (\text{trait\_weight} * \text{weight\_multiplier}_{trait\_weight}), \quad (1)$$

$$\text{new\_weight\_multiplier}_{trait\_weight} = \text{old\_weight\_multiplier}_{trait\_weight} - \text{decay\_constant}_{trait\_weight} \quad (2)$$

The weight_multiplier$_{trait\_weight}$ indicates the weight multiplier assigned to a given bucket for that given trait weight, and decay_constant$_{trait\_weight}$ indicates the decay constant assigned to the bucket for that given trait weight. The trait_weight variable is the trait weight that corresponds for a given bucket and is associated with a rule. The new_sequence_weight variable is the new weight value of a DDNA sequence and is dependent on the previous weight value of the DDNA sequence (old_sequence_weight) and on the trait weight for the given bucket and the weight multiplier for the given bucket.

The variable Tn is the weight of the trait at position n in the sequence (n is limited to the range −15 to +15 in this example), $L_{Tn}$ is the weight multiplier for the bucket assigned to weight Tn, and $D_{Tn}$ is the decay constant for the bucket assigned to weight Tn.

In the example of FIG. 5, there are the buckets Bn, where n={−15 to +15}. For the bucket $B_{+5}$, n=+5. In other words, the bucket $B_{+5}$ is associated with a rule (or rule trait) that has a trait weight $T_{+5}$=+5. Similarly, for buckets $B_{+8}$ and $B_{+15}$, the trait weights are $T_{+8}$=+8 and $T_{+15}$=+15, respectively.

Assume that the weight multiplier for bucket $B_{+5}$ is $L_{+5}$=1.0, while the other buckets $B_{+8}$ and $B_{+15}$ have the weight multiplier $L_{+8}$ and $L_{+15}$, respectively. The $L_{+5}$ value is a programmable variable that can be set at any value by the engine 160. The weight multipliers $L_{+8}$ and $L_{+15}$ can be separate programmable values and therefore can have the same value as $L_{+5}$ or can be set at other values.

Assume that the decay constant for bucket $B_{+5}$ is $D_{+5}$=0.1, while the other buckets $B_{+8}$ and $B_{+15}$ have the decay constants $D_{+8}$ and $D_{+15}$, respectively. The $D_{+5}$ value is a programmable variable that can be set at any value by the engine 160. The decay constants $D_{+8}$ and $D_{+15}$ can be separate programmable values and therefore can have the same value as $D_{+5}$ or can be set at other values.

In this example, assume also that the weight $T_{+5}$=+5 is assigned to the rule 220(1) and, therefore, the trait weight $T_{+5}$=+5 assigned to traits of rule 220(1). The other trait weights can be assigned to other rules, while other trait weights are not assigned to any rules. For example, $T_{+8}$=+5 is assigned to the rule 220(2) and $T_{+15}$=+15 is assigned to the rule 220(3). For purposes of clarity, in this example, weights $T_{−15}$ to $T_{+4}$, $T_{+6}$ to $T_{+7}$, $T_{+9}$ to $T_{+14}$ are unassigned to any rules. However, the engine 160 is programmable to set any weight to any of the rules 220.

At time t=1, assume that the rules 220(1), 200(2), and 220(3) had fired, indicating a match between these rules and the data object field 210 of a data object 165 that has been scanned by the engine 160.

Therefore, at time t=1, the sequence weight of the DDNA sequence 225 would be expressed by equation (3):

$$\text{sequence weight of the } DDNA \text{ sequence 225} = \quad (3)$$
$$\text{weight of all firing rules} = T_{+5} + T_{+8} + T_{+15} = +5 ++8 ++15 = +28$$

The discrete weight decay effect of the algorithm for a repeating trait weight $T_n$ is now shown.

At subsequent time t=2, assume that the rule 220(1) again fires, indicating a match between this rules and the data object field 210 of a data object 165. In contrast, at time t=s, the rules 200(2) and 220(3) do not fire, indicating a mismatch between these rules and the data object field 210.

The discrete weigh decay effect is based on equation (2) above. In this example, the following values in equation (4) would be applicable to bucket B+5 which is assigned to the firing rule 220(1):

$$\text{new\_weight\_multiplier}_{trait\_weight} = \quad (4)$$
$$\text{old\_weight\_multiplier}_{trait\_weight} - \text{decay\_constant}_{trait\_weight} =$$
$$L_{+5} - D_{+5} = 1.0 - 0.1 = 0.9$$

Therefore, a rule that again fires will have its associated weight multiplier $L_{Tn}$ to be reduced. Since, the weight multiplier for bucket $B_{+5}$ has decayed from 1.0 to 0.9, the new sequence weight of DDNA sequence 225 is shown in equation (5):

$$\text{new\_sequence\_weight} = \quad (5)$$
$$\text{old\_sequence\_weight} + (\text{trait\_weight} * \text{weight\_multiplier}_{trait\_weight}) =$$
$$+28 + (+5 * 0.9) = 32.5$$

The old_sequence_weight for DDNA sequence 225 was previously +28 as shown in equation (3) above. Without the decay effect of the algorithm, the new_sequence_weight of DDNA sequence 225 would be equal to the value 33 (33=+28++5), instead of the decayed value of 32.5 in equation (5).

If at subsequent time t=3, the rule 220(1) again fires, and the rules 200(2) and 220(3) do not fire, then the weight multiplier of bucket $B_{+5}$ again decays as shown in equation (6) where the old_weight_multiplier$_{trait\_weight}$ variable is shown in equation (4) above:

$$\text{new\_weight\_multiplier}_{trait\_weight} = \quad (6)$$
$$\text{old\_weight\_multiplier}_{trait\_weight} - \text{decay\_constant}_{trait\_weight} =$$
$$L_{+5} - D_{+5} = 0.9 - 0.1 = 0.8$$

Since, the weight multiplier for bucket $B_{+5}$ has decayed from 0.9 to 0.8, the new sequence weight of DDNA sequence 225 is shown in equation (7):

$$\text{new\_sequence\_weight} = \quad (7)$$
$$\text{old\_sequence\_weight} + (\text{trait\_weight} * \text{weight\_multiplier}_{trait\_weight}) =$$
$$+32.5 + (+5 * 0.8) = 36.5$$

As rule 220(1) continues to fire in the future, the trait_weight*weight_multiplier$_{trait\_weight}$ variable will eventually become zero (0) in value. As a result, when this variable becomes zero, when rule 220(1) fires, this rule will not add additional weight to the sequence weight of the DDNA sequence 225. Therefore, the discrete weight decay algorithm permits weight settings and weight decay to be set on particular rules, so that selected rules that fire multiple times would have less effect or minimal or no effect on the final or resultant sequence weight of the DDNA sequence 225.

Trait Generation

Trait generation is controlled via a matching expression. The matching expression is used to determine if the trait applies to the data set of the data object 165 that is being scanned. If there is a match occurrence, then the trait is included in the generated DDNA sequence 225. As discussed above, that trait is known as an expressed trait.

Figures 6A, 6B:
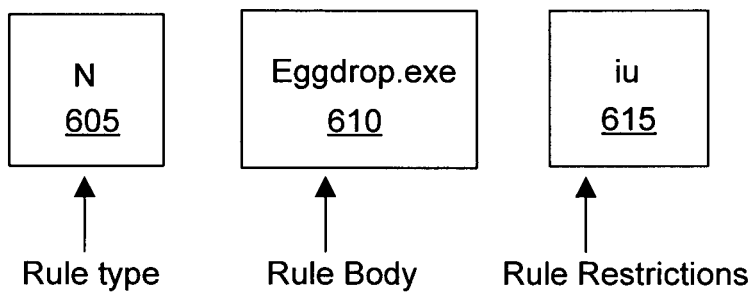
FIGS. 6A and 6B are block diagrams of example rules, in accordance with an embodiment of the invention.

FIG. 6A illustrates an example of a rule 600 with the following three components: N"eggdrop.exe"iu. If a rule 600 fires, then that firing rule is also referred herein as a matching expression 600.

A rule 600 has three components as shown in FIG. 6A. A Rule type 605 indicates which algorithm to use when calculation occurs. Note also that an expression can be formed from a plurality of individual or atomic expression (individual rules). Multiple expressions can be combined by use of Boolean operators (e.g., AND, OR and/or NOT operators). A description of different rule types 605 is shown in the table in FIG. 7A. A rule type 605 can search for any data pattern such as, for example, a substring, byte pattern, name of a process that will contain data to be matched, and/or the like.

The function of the rule type 605 is not limited to the examples disclosed herein, and can be configured to any desired search and match function that can be designed by the user for the engine 160.

The Rule Body 610 indicates the criteria for a match, and is coupled to (and dependent on) the Rule type 605 that is being used. As an example, the rule body 610 may indicate in text "substring HXD", in which case, the expression 600 will be used to match for the text "substring HXD" in the data object field 210.

The Rule Restrictions 615 is an optional feature in the expression 600. The rule restrictions 615 indicate optional controls to be placed on the rule to be applied by the expression 600, and are dependent upon both the Rule Body 610 and Rule type 605. For example, a restrictor 615 can indicate if the text to be matched will be case sensitive or case insensitive, or if the text to be searched is in the kernel address or user address, or if the text has to occur in a process of a given name. Other restriction functionalities can be programmed for a restrictor 615.

FIG. 6B is a diagram illustrating an example of an expression 600A, in accordance with an embodiment of the invention. The rule type, N, indicates a name to be matched with the content of the data object field 210 (e.g., name of a module, driver, file, process, or other objects). The text, eggdrop.exe, between the quotes indicates the string to be matched in the content of the data object field 210. The restrictor, i, indicates that the string, eggdrop.exe, is a case insensitive string. The restrictor, u, indicates that the string, eggdrop.exe, to be matched will be for data in the memory region for the user mode.

FIG. 7 is a table that list additional examples of rule types 615 and associated descriptions and names for the rule types. Note that additional rule types may be designed and added to the list in FIG. 7.

For example, the rule type, B, is a straight byte search to be performed in the content of the data object field 210, and the rule type, S, is a string search to be performed in the content of the data object field 210.

As another example, the rule type, T, permits an expression 600 to reference one or more additional expressions. For example, a trait of an expression 600 could references a trait A, trait B, and trait C, all of which would be applied to the content of the data object field 210. If each of the traits A, B, and C fires, then the trait for expression 600 (with the rule type T) would also fire.

As also mentioned above, the traits of the different rule types can be combined via Boolean operators. Also weights can be assigned to each trait of rule types, and the discrete weight decay algorithm can be used with one or more traits as discussed above. The use of Boolean operators and weights provided flexibility in detecting for suspicious data objects and improved classification of data objects.

As an example, a high weight (e.g., +15) could be given to the expression 600 (with rule type T) that fires, while low weights (e.g., between 0 through +8) could be given to each of the traits A, B, and C that fire. Therefore, an embodiment of the invention provides flexibility by allowing a first weight value to be assigned to a set comprising a plurality of firing rules (i.e., the set of firing traits A, B, and C) in this example, and allowing different weight values for each individual rule (each of the individual traits A, B, and C).

As another example, the rule type, Z, permits an expression 600 to generate a fuzzy hash value based on a search of the content of the data object field 210. Typically, the fuzzy hash value is a sequence of bytes (e.g., hexadecimal bytes). A fuzzy hash is a special form of hash that can be calculated against varied data streams and can then be used to determine the percentage of match between those data streams. For example, in FIG. 8, the rule type, F, indicates a fuzzy hash algorithm is performed by the expression, and the string 805 of fuzzy hash between the quotation marks (" ") is

F92EC292021302C252C76ECECDF12E5DADA34BA-94456D.

There are multiple restrictors 810 and 820 that are operated by the Boolean operator 815 "AND". The restrictor 810 is the text, k, at the end of the fuzzy hash string, indicating that the kernel mode is applicable for the content being scanned (i.e., the comparison is with content in the kernel module or kernel region). The restrictor 820 indicates the match percentage value against the fuzzy hash. In this example, the match percentage value must be approximately 80% or better between the fuzzy hash and the hash of the content of the data object field 210. The restrictor(s) can be programmed via engine 160 to other values. As an example operation, the engine 160 would calculate hash values of substrings in the data object field 210 and compare these calculated hash values with the fuzzy hash 805. If there is a given match percentage value (e.g., 80% in this example) is satisfied between the calculated hash values of the substrings and the fuzzy hash 805, then the expression 600 would fire, indicating a match occurrence. A fuzzy hash value can be calculated by, for example, an MD5 checksum operation, although other suitable hash operations may be used instead.

Extended Qualifiers

Some rule types 605 may need more specific restrictions 615, which can be called an "extended qualifier". FIG. 9A illustrates a function call rule 900 with extended qualifier in field 905:

C"KeAttachProcess"k{extended qualifier}

The field 910 contains the rule type, C, which indicates from Table 1 that rule 900 searches for a function call in, for example, the code in the data object field 210. The field 915 indicates that the function call is known by the name, KeAttachProcess. The field 920 is a restrictor indicating that the function call, KeAttachProcess" must exist in a kernel module or kernel address space.

The field 905 is the extended qualifier field, which is an argument (or arguments) for the restrictor 920. Any suitable arguments with use of suitable syntax components can be placed in the extended qualifier field 905, in order to place more specific restrictions on a given rule type 605.

FIG. 9B illustrates a function call rule 900A with an example of an extended qualifier in the field 905A: C"KeAttachProcess"k{% PUSH %,len,arg}. The rule 900A indicates that the function call known as "KeAttachProcess" must exist in a kernel module (or space), as in the example of FIG. 9A, and that preceding the function call there must be a PUSH instruction (as shown in field 925) with the specified length (as shown in field 930) and argument (as shown in field 935). Therefore, the rule 900A would not fire, unless there is a matching function call named, KeAttachProcess, in kernel mode and with an argument PUSH of a given length as specified by the len value (length value) 930. Other suitable functions, besides the example of FIG. 9B, could also be used as extended qualifiers such as virtual address ranges.

Module Name Rules

The term, "modules", in the vocabulary of this document, can refer to, e.g., the loaded programs, executables, libraries, and drivers of a running computer system. Modules typically are assigned human readable names. The rule type, N, simply compares the module name to the given string.

For example, FIG. 10A shows the rule 1000A with the rule type N in field 1005A:

N"eggdrop.exe"iu.

Rules can also be written in a longhand form. For example, the shorthand form of rule 1000A of FIG. 10A can be written in a longhand form as shown in the rule expression 1000B of FIG. 10B:

(N="eggdrop.exe"i AND % RING %="usermode").

The restrictor, i, in field 1010 (FIG. 10A) is written in the longhand form, usermode, in the field 1015 (FIG. 10B).

As another example, the shorthand form of rule 1000A of FIG. 10A can be written in a longhand form as shown in the rule expression 1000C of FIG. 10C:

(% NAME %="eggdrop.exe"i AND % RING %="usermode").

The rule type, N, in field 1020 (FIG. 10A) is written in the longhand form, % NAME %, in the field 1025 (FIG. 10C).

Module Import Rules

Imports are named functions that are used in one module, but implemented in another module. As such, they represent a named connection between two modules. These functions are commonly used with libraries. Furthermore, each import name is typically associated with known software behaviors. As such, they make ideal rules for determining software behavior. For example, in FIG. 11, the module import rule 1100 has the rule type, I, is in field 1105, indicating an import rule:

I"KeAttachProcess"k AND % DRIVERCHAIN %= "NDIS"

The above example specifies the import must be in kernel-mode (field 1110) and that the driver module must be part of the "NDIS" driver chain (field 1115). The name of the driver chain in this example is NDIS which stands for Network Device Interface Specification. In the Windows operating system, device drivers are linked by chains. Therefore, other device drivers (e.g., keyboard driver, USB port, video drivers, and other drivers) will each have a linked chain.

Function Hook Rules

Functions are discrete units of software computation and have very specific and identifiable behaviors. Use of functions can reveal software behaviors. Some malicious software attempts to bypass or alter the behavior of existing functions via a technology known as hooking. Therefore, detecting hooks on specific named functions is an effective method to detect malicious software. Function hook rules can be used to detect hooks on various named functions. For example, FIG. 12, the function hook rule 1200 is shown with the rule type, H, in field 1205:

H"EnumServiceGroupW"u.

A hook must be detected on the named function (as noted in field 1210), and the restrictor in field 1215 indicates usermode only.

Byte Sequence Rules

In a very general form of rule, any data sequence of bytes can be detected. This rule form can be used to detect code sequences as well, since code sequences are ultimately encoded as data. For example, in FIG. 13, the rule 1300 has rule type, B, in field 1305, indicating a byte search algorithm:

B[60 9C E8 ?? ?? ?? ?? 9D 61]c.

The field 1310 between the brackets indicates the hexadecimal values to be matched with the scanned data object. This rule is displaying the use of wildcard characters. The wildcard character, ??, indicates that any byte may exist at those particular locations in field 1310.

The restrictor, c, in field 1315 indicates that the search will be for code sequences only.

Figure 14:
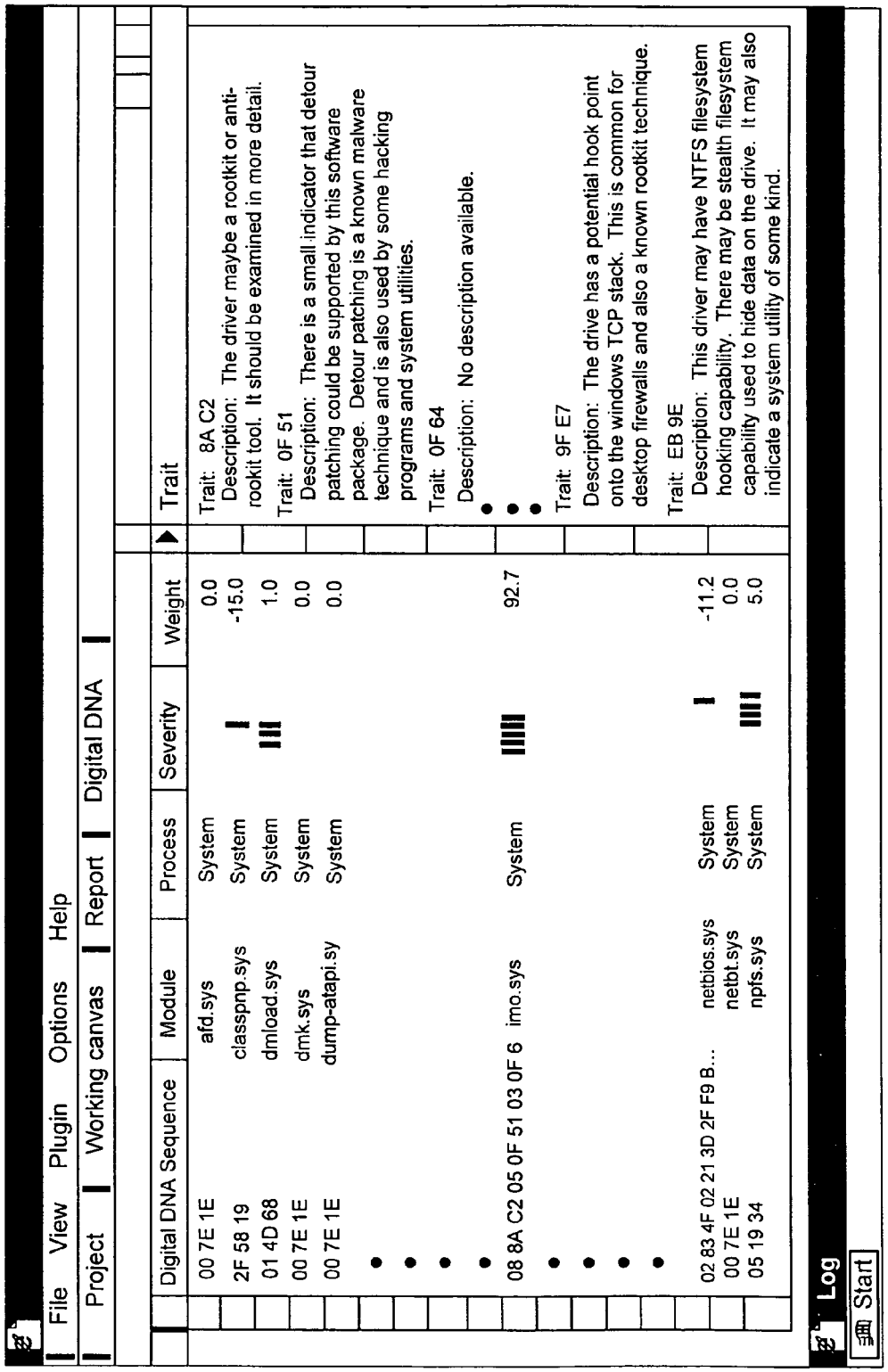
FIG. 14 is a sample screenshot that illustrates the digital DNA sequence (in human readable form) with the calculations performed for every module found in a physical memory snapshot, in accordance with an embodiment of the invention.

FIG. 14 is a sample screenshot 1400 that illustrates the digital DNA sequence 225 (in human readable form) with the calculations performed for every module found in a physical memory snapshot in e.g., the memory 125 (FIG. 1). The engine 160 code has been integrated with the commercially-available product known as Responder™, in order to generate the sample screenshot in FIG. 14.

In the figure, the DDNA sequences can be seen on the left side of the screenshot, and a summary describing each trait found in an individual sequence is shown on the right side of the screenshot. The descriptions are looked up in a database using the hash code of the trait. The color of the trait indicates the weight of the trait. The DDNA sequences themselves are also showing their weights. For example, there is a very high scoring DDNA sequence on the module named "iimo.sys" (having a weight of 92.7 as shown on the left side of the screenshot).

Figure 15:
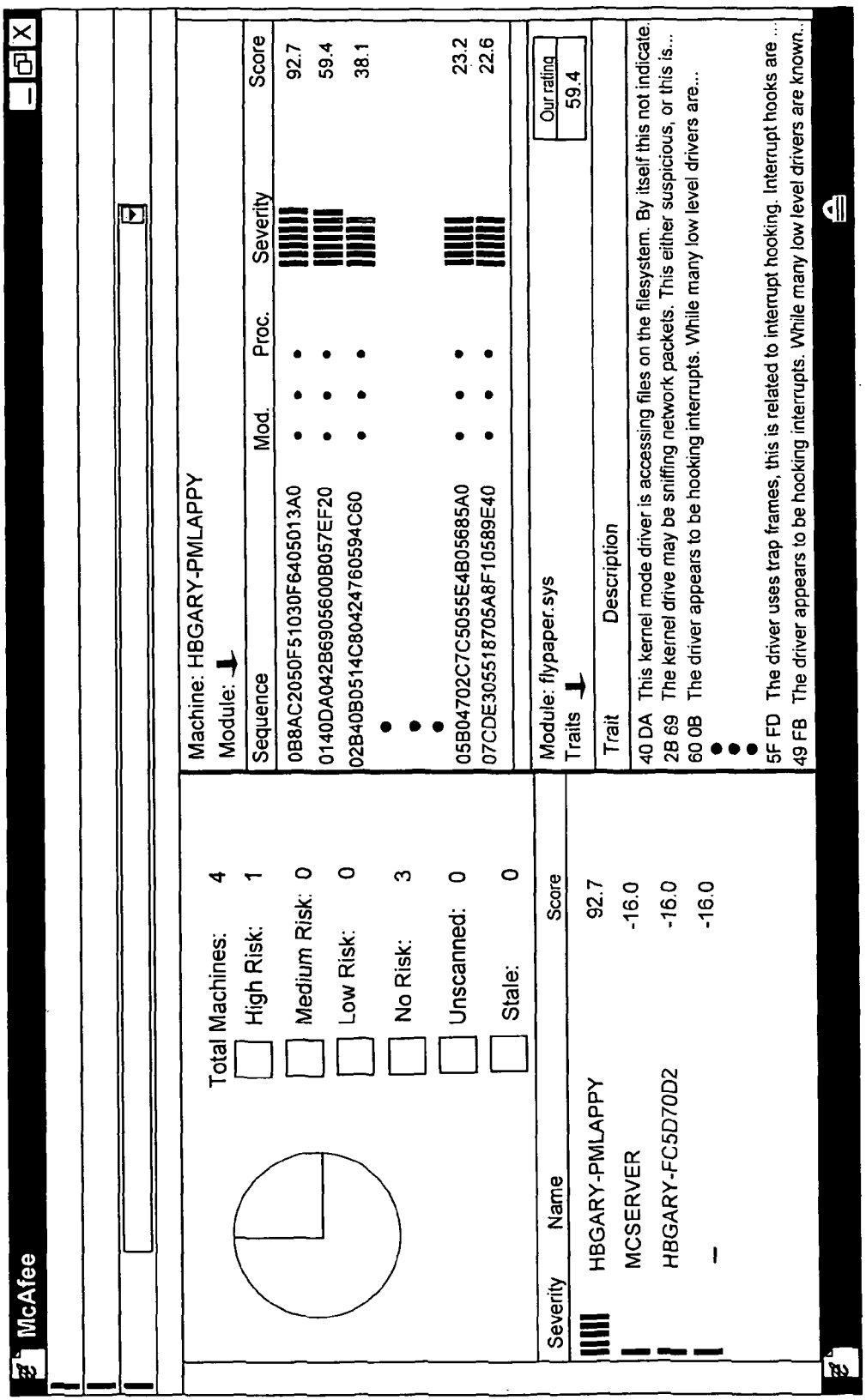
FIG. 15 is a sample screenshot that illustrates the digital DNA sequence results in human readable form, with the scan results of multiple nodes capable of being shown on the right side of the screenshot, in accordance with an embodiment of the invention.

An embodiment of the invention could also be applied to an Enterprise system and can be used to monitor many nodes in the Enterprise system. FIG. 15 is a sample screenshot 1500 that illustrates the digital DNA sequence 225 results in human readable form, with the scan results of multiple nodes capable of being shown on the right side of the screenshot 1500. In FIG. 15, an embodiment of the invention with the DDNA system can be seen integrated with a commercial enterprise endpoint protection tool (e.g., McAfee E-Policy Orchestrator). In this configuration, it can be seen that DDNA can be applied across an Enterprise for purposes of endpoint protection.

What is claimed is:

1. A computer-implemented method of classifying a data object, comprising:
    scanning the data object with a processor;
    evaluating contents of the data object based on at least one selected rule;
    generating a sequence that classifies at least some contents of the data object, and
    storing the sequence as a single digital file in a selected target memory,
    further comprising a discrete weight decay algorithm comprising: assigning a given weight value for a rule; and if additional values are received for the given weight value for the rule, then permitting those additional values to have a progressively lesser effect on a summed weight value.

2. The method of claim 1, wherein the sequence comprises at least one expressed trait with reference to the data object.

3. The method of claim 1, wherein the sequence comprises a rule type.

4. The method of claim 1, wherein the sequence comprises a rule body.

5. The method of claim 1, wherein the sequence comprises a rule restrictor.

6. The method of claim 1, wherein the sequence comprises the rule restrictor includes an extended qualifier.

7. The method of claim 1, wherein a rule can be written in longhand form.

8. The method of claim 1, wherein a rule can be written with wildcard characters.

9. The method of claim 2, wherein the expressed trait comprises a rule.

10. The method of claim 2, wherein the expressed trait comprises a weight.

11. The method of claim 2, wherein the expressed trait comprises a trait code.

12. The method of claim 2, wherein the expressed trait comprises a description.

13. The method of claim 2, wherein the expressed trait comprises a control code that sets an expression mode or a match definition mode.

14. An apparatus for classifying a data object, comprising:
    a processor; and
    a sequencing engine that is executable by the processor, wherein the sequencing engine scans the data object, evaluates contents of the data object based on at least one selected rule, generates a sequence that classifies at least some contents of the data object, and stores the sequence as a single digital file in a selected target memory,
    wherein the sequencing engine further performs a discrete weight decay algorithm that assigns a given weight value for a rule and permits additional values to have a progressively lesser effect on a summed weight value if those additional values are received for a given weight value for the rule.

15. The apparatus of claim 14, wherein the sequence comprises at least one expressed trait with reference to the data object.

16. The apparatus of claim 14, wherein the sequence comprises a rule type.

17. The apparatus of claim 14, wherein the sequence comprises a rule body.

18. The apparatus of claim 14, wherein the sequence comprises a rule restrictor.

19. The apparatus of claim 14, wherein the sequence comprises the rule restrictor includes an extended qualifier.

20. The apparatus of claim 14, wherein a rule can be written in longhand form.

21. The apparatus of claim 14, wherein a rule can be written with wildcard characters.

22. The apparatus of claim 15, wherein the expressed trait comprises a rule.

23. The apparatus of claim 15, wherein the expressed trait comprises a weight.

24. The apparatus of claim 15, wherein the expressed trait comprises a trait code.

25. The apparatus of claim 15, wherein the expressed trait comprises a description.

26. The apparatus of claim 15, wherein the expressed trait comprises a control code that sets an expression mode or a match definition mode.

27. An apparatus for classifying a data object, configured to implement the following steps:
   scanning the data object using a processor;
   evaluating contents of the data object based on at least one selected rule;
   generating a sequence that classifies at least some contents of the data object; and
   storing the sequence as a single digital file in a selected target memory,
   further comprising a discrete weight decay algorithm comprising: assigning a given weight value for a rule; and if additional values are received for the given weight value for the rule, then permitting those additional values to have a progressively lesser effect on a summed weight value.

28. An article of manufacture comprising:
   a machine-readable medium having stored thereon instructions to:
   scan a data object;
   evaluate contents of the data object based on at least one selected rule;
   generate a sequence that classifies at least some contents of the data object; and
   storing the sequence as a single digital file in a selected target memory,
   further comprising a discrete weight decay algorithm comprising: assigning a given weight value for a rule; and if additional values are received for the given weight value for the rule, then permitting those additional values to have a progressively lesser effect on a summed weight value.

* * * * *